United States Patent [19]

Miyazawa et al.

[11] 4,451,242

[45] May 29, 1984

[54] METHOD OF CONVEYING PANEL AND SHADOW MASK AND PALLET FOR HOLDING PANEL AND SHADOW MASK AND APPARATUS FOR REMOVING SHADOW MASK FROM PANEL

[75] Inventors: Hideo Miyazawa; Junzo Kitamura, both of Mobara, Japan

[73] Assignee: Hitachi, Ltd., Tokyo, Japan

[21] Appl. No.: 384,518

[22] Filed: Jun. 3, 1982

[30] Foreign Application Priority Data

Jun. 5, 1981 [JP] Japan .................................. 56-85735

[51] Int. Cl.[3] ......................... H01J 9/00; G03B 41/00

[52] U.S. Cl. ........................................ 445/65; 445/68; 430/24

[58] Field of Search .............. 427/68; 430/24; 445/65, 445/68; 313/402

[56] References Cited

U.S. PATENT DOCUMENTS 4,130,919 12/1978 Oyama .................................. 445/68
4,179,200 12/1979 Kotoyori ................................ 354/1
4,325,613 4/1982 Friedrich et al. ..................... 445/65

FOREIGN PATENT DOCUMENTS 54-0040562 3/1979 Japan .................................. 313/402
54-0147774 11/1979 Japan .................................... 445/68
55-0072337 5/1980 Japan .................................... 445/68
57-0005241 1/1982 Japan .................................... 445/65

*Primary Examiner*—Kenneth J. Ramsey
*Assistant Examiner*—Kurt Rowan
*Attorney, Agent, or Firm*—Antonelli, Terry & Wands

[57] ABSTRACT

A pallet constructed to have a panel placed on its surface and formed with a through hole for storing a shadow mask, located below the panel placed on the pallet, and a conveying method using such pallet. The conveying method consists in conveying the pallet supporting the panel to the vicinity of a treating device, removing the shadow mask from the panel by moving same downwardly and holding same in the through hole of the pallet, conveying the panel to the treating device to subject same to a predetermined treatment, and placing the treated panel on the pallet. An apparatus for removing the shadow mask from the panel on the pallet and having same held by the pallet is also disclosed.

11 Claims, 9 Drawing Figures

METHOD OF CONVEYING PANEL AND SHADOW MASK AND PALLET FOR HOLDING PANEL AND SHADOW MASK AND APPARATUS FOR REMOVING SHADOW MASK FROM PANEL

BACKGROUND OF THE INVENTION

This invention relates to a method of conveying a panel and a shadow mask of a color television cathode-ray tube in a color television cathode-ray tube production line and a pallet and an apparatus for removing a shadow mask from a panel suitable for use in carrying such method into practice.

The most important problem that should be obviated in automatically performing the process step of forming phosphor dots or stripes having light absorbing material or red, green and blue light emitting phosphors on an inner surface of a panel of a color television cathode-ray tube is how to safely store and convey a shadow mask removed from the panel, which is very fragile. One solution to this problem consists in using a dummy panel for holding the shadow mask and transporting same as disclosed in U.S Pat. No. 4,179,200 granted to Kotoyori on Screen Coating System for Panel of Color Picture Tube. This patent is directed to a screen coating system comprising a panel conveying line, and pluralities of coating devices and exposing devices arranged along the panel conveying line. In this system, panels each having a shadow mask held therein and dummy panels are alternately conveyed successively along the panel conveying line. In the vicinity of each coating device, the panel is fed to the coating device after the shadow mask is removed therefrom to carry out coating as predetermined. Meanwhile the shadow mask removed from the panel is inserted into one of the dummy panels conveyed alternately with the panels to be temporarily stored therein. Being processed through coating, the panel is returned to the conveying line and fed to the next following step on the conveying line after having mounted thereon the shadow mask held in the dummy panel.

An apparatus for removing a shadow mask from a panel and having same held in a dummy panel is disclosed in U.S Pat. No. 4,130,919 granted to Oyama on Apparatus for Removing a Shadow Mask Assembly from a Panel and Inserting Same into a Dummy Panel. This apparatus operates in such a manner that a shadow mask is removed downwardly from a panel conveyed on to the apparatus, a dummy panel is fed to the apparatus simultaneously as the panel is removed, and the shadow mask is moved upwardly into the dummy panel to be held therein.

As described hereinabove, the prior art has used a dummy panel for exclusively storing and conveying a shadow mask. Thus it is necessary to alternately convey the panels and dummy panels along the conveying line. This has made it necessary to elongate the conveying line and has concomitantly increased the area necessary for installing the conveying line. Moreover it is necessary to additionally provide the step of supplying a dummy panel to the shadow mask after the latter is removed from the panel. Thus it has taken a long period of operation time for having the shadow mask in the panel held in the dummy panel.

SUMMARY OF THE INVENTION

Accordingly an object of this invention is to provide a novel method of conveying a panel and a shadow mask capable of reducing the length of a panel conveying line of a system of coating for color television cathode-ray tubes and quickly transferring the shadow mask from the panel to a mask holding means.

Another object of the invention is to provide a novel pallet suitable for use in carrying such method into practice capable of supporting a panel while holding a shadow mask.

Still another object of the invention is to provide a novel apparatus for removing a shadow mask, operative to quickly remove the shadow mask from a panel supported on a pallet and having the shadow mask held by the pallet.

According to the invention, there is provided a method of conveying a panel and a shadow mask comprising the steps of placing on a pallet the panel holding the shadow mask therein, conveying the pallet to a mask removing station in the vicinity of a treating device, removing the shadow mask from the panel on the pallet and having same held in the pallet at the shadow mask removing station, conveying the panel to the treating device to be subjected to a predetermined treatment, and placing the panel on the pallet after being treated in the preceding step.

According to the invention, there is also provided a pallet for holding a panel and a shadow mask comprising support means for supporting the panel at its lower end edge, means for defining a hole for storing the shadow mask, said hole being located below the panel supported by the panel support means, and a plurality of dummy pins attached to an inner surface of the hole for engaging springs connected to the shadow mask for holding the latter.

According to the invention, there is also provided an apparatus for removing a shadow mask from a panel held by a pallet and having same held by dummy pins in a hole for holding the shadow mask in the pallet, such apparatus comprising: first positioning means for positioning in a predetermined position the pallet holding the panel, second positioning means for positioning the panel on the pallet that has been positioned, means for affixing the panel that has been positioned to the pallet, and shadow mask removing means for removing the shadow mask from the panel and having same held by dummy pins in the hole for holding the shadow mask, the shadow mask removing means comprising a support member having a support surface for placing the shadow mask thereon at its lower end edge, a plurality of movable claws attached to the support member in positions corresponding to those of a plurality of shadow mask springs secured to side surfaces of the shadow mask and movable in a manner to cause the shadow mask springs to be deformed in directions toward the side surfaces of the shadow mask, means for driving the movable claws, and a device for moving the support member substantially in a vertical direction between an uppermost shadow mask removing position, an intermediate shadow mask mounting position and a lower standby position.

BRIEF DESCRIPTION OF THE DRAWINGS

These and other objects, features and advantages of the invention will hereinafter be made evident in conjunction with the following description and accompanying drawings, in which drawings.

DETAILED DESCRIPTION OF THE PREFERRED EMBODIMENT

Figure 1:
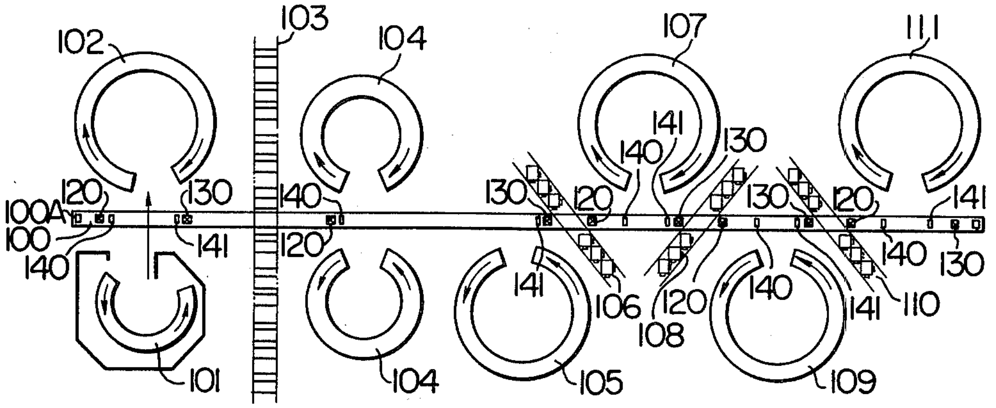
FIG. 1 is a schematic view showing a panel coating system in which the invention is incorporated.

FIG. 1 shows a screen coating system incorporating therein the method of conveying a panel and a shadow mask according to the invention. The coating system comprises a panel conveying line 100 lengthily extending in the central portion and a cleaning line 101, a photoresist coating line 102, an exposing line 103, a graphite coating line 104, a green phosphor coating line 105, an exposing line 106, a blue phosphor coating line 107, an exposing line 108, a red phosphor coating line 109, an exposing line 110 and an emulsion coating line 111, all arranged along the panel conveying line 100 on opposite sides thereof. Located on the conveying line 100 are mask removing apparatus 120 for removing a shadow mask from a panel and mask mounting apparatus 130 for mounting a shadow mask on a panel which are arranged alternately. Three-dimensional conveyors, not shown, for lifting the shadow mask from the conveying line 100, that has been removed from the panel and returning same to the conveying line 100 after lapse of a predetermined time are located above the conveying line 100. In the figure, the positions in which the shadow masks are lifted by the three-dimensional conveyors are designated by the reference character 140 and the positions in which the shadow masks are returned to the conveyors are designated by the reference character 141.

Figure 2:
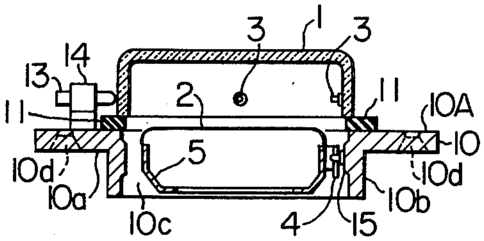
FIG. 2 is a sectional view of the pallet comprising one embodiment of the invention, showing the pallet as holding a panel and a shadow mask.
Figure 4:
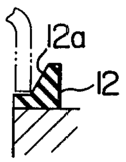
FIG. 4 is a sectional view as seen in the direction of arrows IV—IV in FIG. 3.
Figure 3:
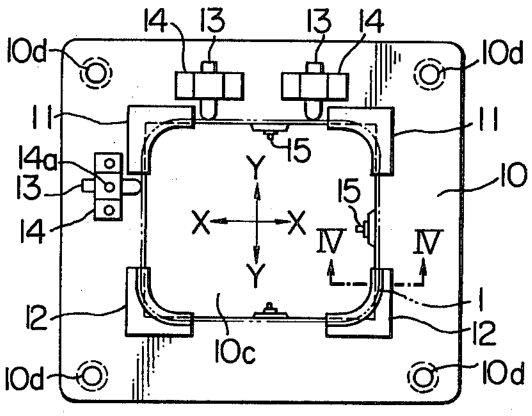
FIG. 3 is a plan view of the pallet shown in FIG. 2.

Referring to FIGS. 2 and 3, a pallet 10 used for conveying a panel 1 comprises a pallet body 10A including a horizontally extending flange 10*a* and a frame 10*b* projecting vertically downwardly from the flange 10*a*. The pallet body 10A is preferably formed of an aluminum alloy. On the upper surface of the pallet body 10A are secured two flat pads 11 and two guide pads 12 of nylon for receiving four corners of a sealing surface at a lower end of the panel 1. The guide pads 12 each have a sliding guide surface 12*a* (see FIG. 4). In addition, the pallet body 10A has secured to its upper surface pin holders 14 holding reference pins 13 for positioning the panel 1 in X—X and Y—Y directions on the pallet. The reference pins 13 are each held by one of the pin holders 14 for axial movement and secured in place by a set screw 14*a*. The pallet body 10A is formed in its central portion with a through hole 10*c* located below the panel placed in a predetermined position on the surface of the pallet 10. The through hole 10*c* has a rectangular cross-sectional area substantially equal in dimensions to the maximum dimensions of the inner surface of the panel 1 in the X—X and Y—Y directions. The through hole 10*c* has attached to its inner surface dummy pins 15 adapted to be inserted in holes in mask springs 4 of a shadow mask 2 for holding the latter in place. The dummy pins 15 are of the same shape and configuration as panel pins 3 attached to the panel 1 and are arranged in positions immediately below the panel pins 3 of the panel 1 which has been positioned on the pallet. The dummy pins 15 are located with respect to a vertical in such a manner that the lower end edge of the shadow mask 2 held thereby is kept from projecting from the lower end of the frame 10*b*. The flange 10*a* of the pallet 10 is formed with a plurality of positioning openings 10*d* of a conical shape for positioning the pallet 10 in a predetermined position on a shadow mask removing apparatus presently to be described.

Figure 5:
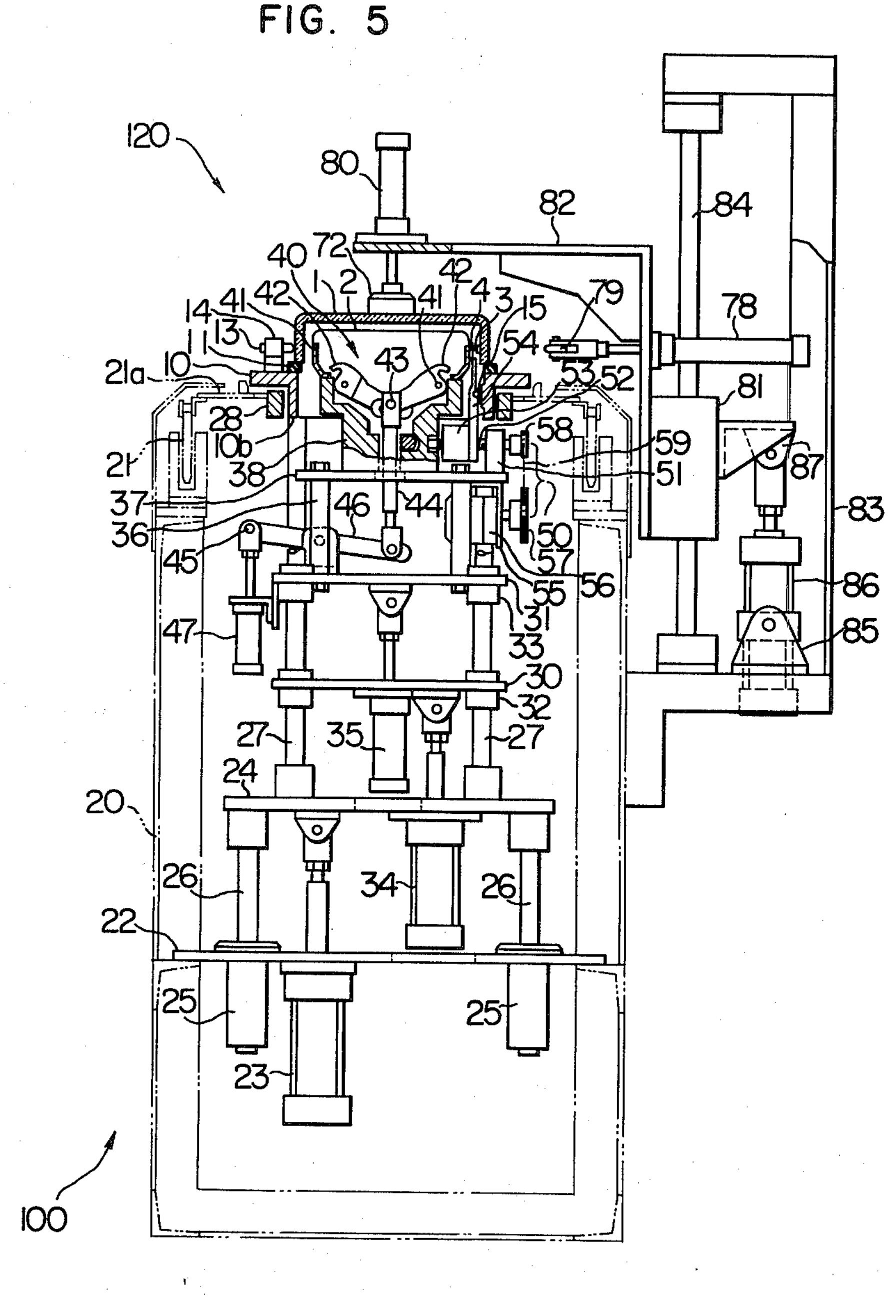
FIG. 5 is a side view showing, partly in cross section, the apparatus for removing the shadow mask comprising one embodiment of the invention and the pallet placed on the apparatus.
Figure 8:
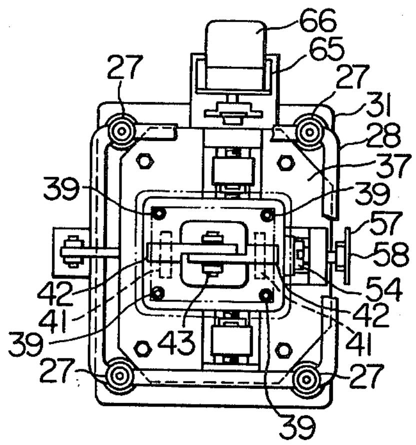
FIG. 8 is a plan view of the shadow mask removing apparatus from which the pallet has been removed.

The shadow mask removing apparatus 120 for removing the shadow mask 2 in the panel 1 held on the pallet 10 and letting same held in the through hole 10*c* of the pallet 10 will be described in detail. Referring to FIG. 5, the conveying line 100 includes a conveyor frame 20 and a conveyor 21 supported on an upper end of the conveyor frame 20. The shadow mask removing apparatus 120 is built in the frame 20. The shadow mask removing apparatus 120 comprises a base plate 22 secured to the conveyor frame 20 and supporting an air cylinder 23 and a guide cylinder 25. The air cylinder 23 has a movable rod secured at its forward end to an elevatory base plate 24 having secured thereto a guide rod 26 vertically movable along the guide cylinder 25 secured to the base plate 22. The elevatory base plate 24 has a plurality (four in this embodiment) of reference rods 27 extending upwardly of a support member 21*a* of the conveyor 21 and each having a forward end shaped conically to be fitted in one of the positioning holes 10*d* of the pallet 10. The forward end portions of the reference rods 27 are connected together by a support frame 28 of a rectangular shape as best shown in FIG. 8 to provide a unitary structure.

Figure 7:
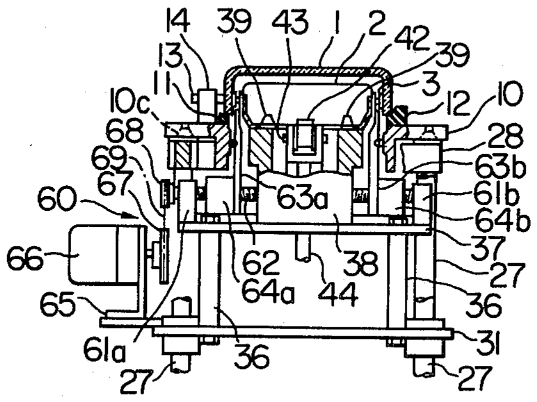
FIG. 7 is a sectional side view, as seen in a direction at a right angle to the direction in which the apparatus is shown in FIG. 5, of the essential portions of the apparatus shown in FIG. 5.
Figure 9:
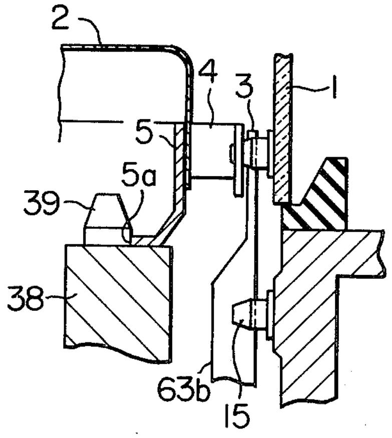
FIG. 9 is a sectional view, showing on an enlarged scale, a portion of the apparatus shown in FIG. 7.

The reference rods 27 have secured thereto a lower elevatory plate 30 and an upper elevatory plate 31 for vertical movement through slide cylinders 32 and 33 respectively secured thereto. The lower elevatory plate 30 has secured thereto a movable rod of an air cylinder 34 secured to the elevatory base plate 24 and the upper elevatory plate 31 has secured thereto a movable rod of an air cylinder 35 secured to the lower elevatory plate 30. A base 37 is secured to the upper elevatory plate 31 through a plurality of support rods 36 and has secured to its central portion a support member 38 for supporting a frame 5 of the shadow mask 2 at its lower end. A plurality of guide pins 39 for guiding an inner peripheral surface 5*a* of the frame 5 of the shadow mask 2 for positioning the shadow mask 2 in the X—X and Y—Y directions are attached to the surface of the support member 38 as shown in FIGS. 7–9.

The support member 38 has assembled therewith a clamp mechanism 40 for clamping the frame 5 of the shadow mask 2 against the support member 38 by means of a linkage. The clamp mechanism 40 comprises two clamp claws 42 mounted on the left and right for pivotal movement about clamp pins 41 secured to the support member 38, a connecting rod 44 extending through the central portion of the support member 38 for vertical movement and having connected to its upper end a connecting pin 43 connected to the clamp claws 42, and an air cylinder 47 connected to the upper elevatory plate 31 for moving the connecting rod 44 vertically through a connecting metal member 45 and a link 46.

Claw units 50 (see FIG. 5) and 60 (see FIG. 7) are supported on the base 37 for causing the shadow mask springs 4 to be deformed toward the side surfaces of the shadow mask 2. The claw unit 50 shown in FIG. 5 includes a movable block 53 threadably engaging a feed screw 52 rotatably supported by a bearing 51 secured to the base 37 and the support member 38, and a claw 54 secured to the movable block 53 adapted to be brought into engagement with the outer side of one of the shadow mask springs 4 to actuate same. The feed screw 52 is connected to a motor 56 secured to a motor bracket 55 secured to the base 37, through a sprocket wheel 57 secured to an output shaft of the motor 56, a sprocket wheel 58 secured to the feed screw 52 connected together and a chain 59, so that the feed screw 52 is rotated by the motor to move the movable block 53 supporting the claw 54 in the X—X direction in FIG. 3. The claw unit 60 shown in FIG. 7 which is substantially of the same construction as the claw unit 50 includes a feed screw 62 extending through the support member 38 and supported at opposite end portions by a pair of bearings 61*a* and 61*b*. The feed screw 62 has threaded portions directed in opposite directions and each extending to the substantially central portion of the feed screw 62 to have movable blocks 64*a* and 64*b* having claws 63*a* and 63*b* engage the respective threaded portions of the feed screw 62. Thus rotation of the feed screw 62 causes the movable blocks 64*a* and 64*b* to move simultaneously in the Y—Y direction in FIG. 3 toward or away from each other. The feed screw 62 is connected to a motor 66 secured to a motor bracket 65 through sprocket wheels 67 and 68 and a chain 69 for rotation.

Figure 6:
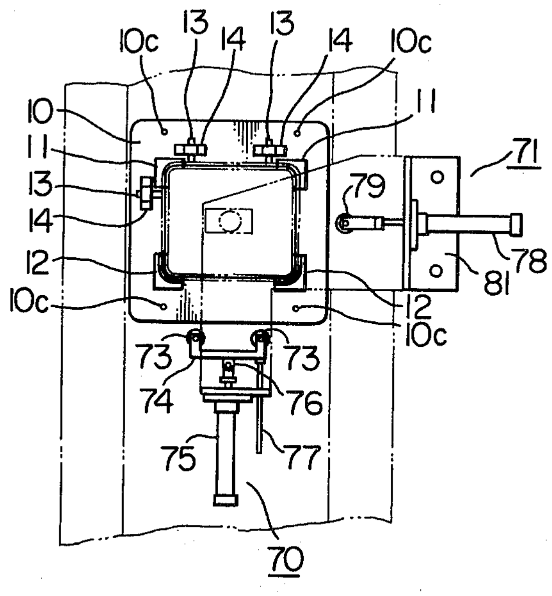
FIG. 6 is a plan view of the apparatus shown in FIG. 5.

As shown in FIGS. 5 and 6, a panel positioning and holding mechanism is provided for regulating the position of the panel 1 placed on the pallet 10 with respect to the X—X and Y—Y direction. The panel positioning and holding mechanism comprises pushers 70 and 71 located in spaced juxtaposed relation to a skirt of the panel 1, and a panel holddown member 72 for urging the panel 1 against the pallet 10. The pusher 70 has two pusher rollers 73 formed of nylon held by a roller holding metal member 74 which is mounted on a rod of an air cylinder 75 through a shaft pin 76 with a slight reserve for rotation in a horizontal plane. A guide 77 is secured to the roller holding metal member 74 for preventing rotation of the rod of the air cylinder 75. The pusher 71 has a pusher roller 79 formed of nylon mounted on a rod of an air cylinder 78. The panel holddown member 72 is formed of resilient material, such as rubber, and secured to the forward end of a rod of an air cylinder 80 vertically arranged above the panel 1. The air cylinders 75, 78 and 80 are secured to an L-shaped bracket 82 secured to an elevatory block 81 which is supported for vertical movement by a guide rod 84 secured to a base plate 83. The elevatory block 81 is connected through a connecting metal member 87 to a movable rod of an air cylinder 86 supported by a bracket 85 attached to the base plate 83.

Operation of removing the shadow mask 2 by means of the shadow mask removing apparatus 120 will be described. A panel 1 having a shadow mask 2 mounted thereon is placed on a pallet 10 and the pallet 10 is conveyed by the conveyor 21, resting on the support member 21*a* thereof, to the apparatus 120, where the pallet 10 is brought to a halt by stopper means, not shown. As the pallet 10 is brought to a halt, the air cylinder 23 is brought to an extended position to push the elevatory base plate 24 to a predetermined elevation. This raises the reference rods 27 to a predetermined elevation to bring the conical projections at the forward end thereof into engagement in the positioning openings 10*d* of the pallet 10 to thereby position the pallet 10 and at the same time causes the pallet 10 to float on the conveyor surface. Then a normally extended air cylinder 86 is withdrawn to move a bracket 82 downwardly, to allow the pusher rollers 73 and 79 of the pushers 70 and 71 to move to positions corresponding to the outer side surfaces of the panel 1. Thereafter the air cylinders 75 and 78 are extended to press against outer side surfaces of the panel 1 through the pusher rollers 73 and 79 respectively to position the panel 1 with respect to the X—X and Y—Y directions by bringing the opposed outer side surfaces into contact with the reference pins 13 associated therewith. The air cylinder 80 is extended to press against the central portion of the panel 1 from above through the panel hold-down member 72. Thereafter the air cylinders 75 and 78 for the pushers 70 and 71 are restored to the original positions.

Then the air cylinders 34 and 35 are extended to raise the upper and lower elevatory plates 30 and 31 simultaneously. This brings the claws 54, 63*a* and 63*b* to positions between the inner side surfaces of the panel 1 and the shadow mask springs 4 (see FIG. 9). At the same time, the support member 38 moves upwardly to bring the guide pins 39 to positions in which they are inserted in the frame 5 of the shadow mask 2. In this case, a small clearance is provided between the undersurface of the frame 5 and the support member 38 to keep the frame 5 of the shadow mask 2 from being pushed upwardly after the lower elevatory plate 30 and upper elevatory plate 31 have reached upper limits. The motors 55 and 66 are actuated to cause the feed screws 52 and 62 to rotate to thereby move the movable blocks 53, 64*a* and 64*b* toward the center of the shadow mask 2. This makes the claws 54, 63*a* and 63*b* interposed between the panel 1 and mask springs 4 move the mask springs 4 toward the shadow mask 2, to thereby bring the mask springs 4 out of engagement with the panel pins 3. After the mask springs 4 are released from the panel pins 3, the normally extended air cylinder 47 is withdrawn and the clamp claws 42 are pivotally moved through the connecting metal member 45, link 46 and connecting rod 44, to secure the frame 5 of the shadow mask 2 on the surface of the support member 38 in a manner to press thereagainst. This allows the shadow mask 2 removed from the panel to be held on the support member 38.

Thereafter the air cylinder 35 is withdrawn and the upper elevatory plate 31 moves downwardly. The distance covered by the downward movement of the upper elevatory plate 31 is a distance which is covered by the movement of the openings of the springs 4 of the shadow mask 2 before the dummy pins 15 attached to the frame 10*b* of the pallet 10 are brought into coincidence therewith following removal of the shadow mask 2 from the panel 1. Then the motors 55 and 66 are rotated in the reverse direction to cause the feed screws 52 and 62 to rotate in the reverse direction, to thereby move the claws 54, 63*a* and 63*b* that have pressed against the springs 4 in a direction opposite the shadow mask 2 side to release the springs 4. Thus the openings of the springs 4 receive the dummy pins 15 therein as shown in FIG. 2. Thereafter the air cylinder 47 is extended to release the clamp claws 42 in clamping engagement with the shadow mask 2 from clamping engagement therewith.

Thus removal of the shadow mask 1 from the panel is finished and the air cylinders 34 and 23 are withdrawn to return the pallet 10 to the conveyor 21. At the same time, the air cylinder 86 is extended upwardly to return the pushers 70 and 71 and panel hold-down member 72 to the original positions. At this time, the panel 1 is placed on the surface of the pallet 10 as shown in FIG. 2, and the shadow mask 2 removed from the panel 1 is supported by the dummy pins 15 of the pallet 10.

Operation of the screen coating system shown in FIG. 1 will be described. Panels 1 to be treated are successively fed to a position 100A on the left end of the conveying line 100 with each panel 1 having a shadow mask 2 being built therein and placed on a pallet 10. Pallets 10 each supporting a panel 1 are fed rightwardly along the conveying line 100 into the shadow mask removing apparatus 120. In the shadow mask removing apparatus 120, the shadow mask 2 is removed from the panel 1 and held by the dummy pins 15 in the through hole 10*c* of the pallet 10, in accordance with the procedures described hereinabove. The panel 1 having the shadow mask 2 removed therefrom is transferred to a cleaning station 101 by conveyor means, not shown, to be cleaned therein before being fed to a photoresist coating line 102, where coats of photoresists are applied to the panel 1.

Meanwhile each pallet 10 holding a shadow mask 2 is forwarded to a position 140 where a three-dimensional conveyor raises same. After holding the pallet 10 for a predetermined time in a raised position, the three-dimensional conveyor places same on the conveying line 100 in a position 141 to be fed on to a device 130 for mounting a shadow mask 2 thereon. The panel 1 having a coat of photoresist applied thereto is placed on the pallet 10 located on the shadow mask mounting apparatus 130 which removes the shadow mask 2 in the pallet 10 and inserts same in the panel 1 to be held therein. The shadow mask mounting apparatus 130 is substantially of the same construction as the shadow mask removing apparatus 120 and the detailed description thereof shall be omitted.

The panel 1 having the shadow mask 2 inserted therein is fed to the exposing line 103 where exposing of the photoresist is effected. After completing exposing on the exposing line 103, the panel 1 is fed along the conveying line 100 to the next following shadow mask removing apparatus 120, where the shadow mask 2 is removed from the panel 1 and fed to a graphite coating line 104. Thereafter operation similar to that described hereinabove is performed.

As can be clearly seen from the aforesaid description, the panel is placed on the pallet capable of holding the shadow mask to be conveyed according to one feature of the invention. This feature offers the advantage that the length of the conveying line can be shortened as compared with the system of the prior art in which the panels and dummy panels are alternately conveyed. The shadow mask removed from the panel has only to be held in the through hole immediately below the panel, thereby enabling operation time to be greatly reduced.

What is claimed is:

1. A method of conveying a panel and a shadow mask comprising the steps of:

placing on a pallet the panel holding the shadow mask therein;

conveying the pallet to a mask removing station in the vicinity of a treating device;

removing the shadow mask from the panel on the pallet and supporting the removed shadow mask in the pallet at the shadow mask removing station;

conveying the panel to the treating device to be subjected to a predetermined treatment; and placing the panel on the pallet after being treated in the preceding step.

2. A pallet for holding a pallet and a shadow mask comprising:

support means for supporting the panel at its lower end edge;

means for defining a hole for storing the shadow mask, said hole being located below the panel supported by the panel support means; and a plurality of dummy pins attached to an inner surface of the hole for engaging springs connected to the shadow mask for holding the latter.

3. A pallet as claimed in claim 2, further comprising means for positioning the panel supported, by said panel support means.

4. A pallet as claimed in claim 3, wherein said positioning means comprises a plurality of reference members adapted to engage adjacent.two outer side surfaces of the panel to effect positioning.

5. A pallet as claimed in any one of claims 2–4, wherein said panel support means comprises four pads to support thereon four corners of the lower end edge of said panel, at least one of said four pads having a slopping guide surface.

6. A pallet as claimed in claims 2–4, further comprising means for defining a plurality of positioning openings, said positioning openings being operative to receive reference rods of a shadow mask removing apparatus to effect positioning of said pallet with respect to the shadow mask removing apparatus.

7. A pallet as claimed in claim 6, wherein said dummy pins are located vertically below shadow mask holding panel pins of the panel held in a predetermined position on the pallet.

8. A pallet as claimed in claim 7, wherein said panel support means comprises four pads to support thereon four corners of the lower end edge of the panel, at least one of said four pads having a sloping guide surface.

9. A pallet as claimed in any one of claims 2–4, comprising a pallet body including a horizontally extending flange, and a frame extending downwardly from said flange, said frame being formed therein with the hole for holding the shadow mask therein.

10. A pallet as claimed in claim 9, wherein said frame of said pallet body extends further downwardly than the shadow mask held by said dummy pins in said hole.

11. A pallet as claimed in claim 9, wherein said pallet body is formed at the undersurface of the flange with a plurality of tapering positioning openings, said tapering positioning openings being operative to receive reference rods of a shadow mask removing apparatus to position the pallet with respect to the shadow mask removing apparatus.

* * * * *